United States Patent [19]
Hettinga

[11] Patent Number: 5,788,332
[45] Date of Patent: Aug. 4, 1998

[54] SEAT UNIT AND CUSHION

[76] Inventor: Siebolt Hettinga, 2123 N.W. 111th St., Des Moines, Iowa 50325

[21] Appl. No.: 639,777

[22] Filed: Apr. 29, 1996

[51] Int. Cl.$^6$ .................................................. A47C 7/02
[52] U.S. Cl. ............................ 297/452.55; 297/452.59
[58] Field of Search ........................ 297/452.59, 452.58, 297/452.55, 452.46, DIG. 1, DIG. 2, 452.54, 452.48, 452.49, 452.27; 5/652, 727; 428/221, 107

[56] References Cited

U.S. PATENT DOCUMENTS

| | | |
|---|---|---|
| 3,628,830 | 12/1971 | Mitjans et al. ............... 297/452.59 |
| 4,743,323 | 5/1988 | Hettinga . |
| 4,837,881 | 6/1989 | Kondo et al. ............... 297/452.27 X |
| 5,000,515 | 3/1991 | Deview ...................... 297/DIG. 2 X |
| 5,067,772 | 11/1991 | Koa ........................... 297/DIG. 2 X |
| 5,456,873 | 10/1995 | Nomizo . |
| 5,482,665 | 1/1996 | Gill . |
| 5,542,747 | 8/1996 | Burchi ....................... 297/DIG. 2 X |

*Primary Examiner*—Milton Nelson, Jr.
*Attorney, Agent, or Firm*—Brian J. Laurenzo; Michael C. Gilchrist

[57] ABSTRACT

A seat unit is provided comprising a base structure and at least one cushion layer comprised of a random mesh of plastic filament between the base structure and the cover layer. The cushion layer not only provides adequate firmness, but has adequate air circulation therethrough. The perimeter of the cushion may be molded in with a plastic base structure, and there may be multiple cushion layers where each layer has a different density. The multiple layers of cushioning where each layer has a different density further allow the seat to have both a specifically desired firmness and air circulation therethrough. Also provided is a method for molding in the cushioning with the base structure as well as molding in a spring layer and a cover layer.

27 Claims, 15 Drawing Sheets

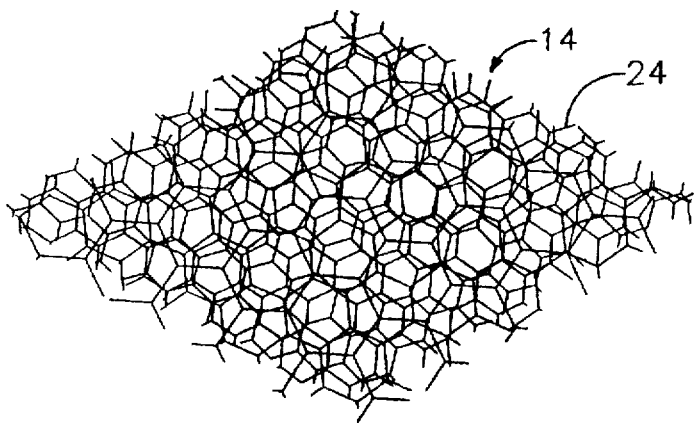 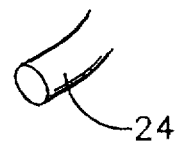
*FIG. 4a*  *FIG. 4a'*
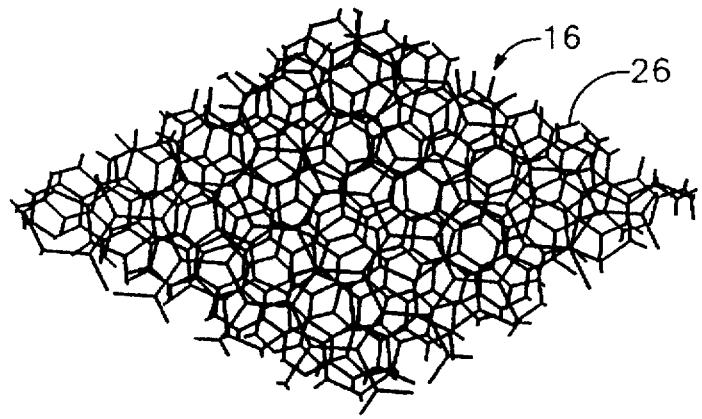 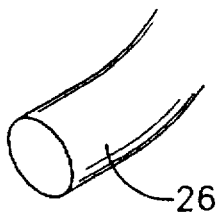
*FIG. 4b*  *FIG. 4b'*
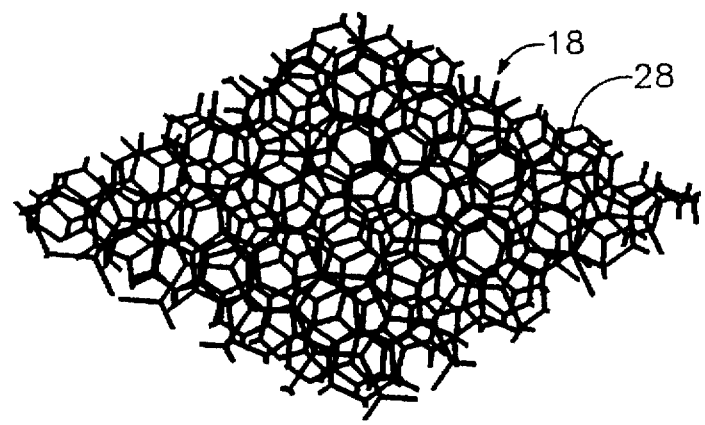 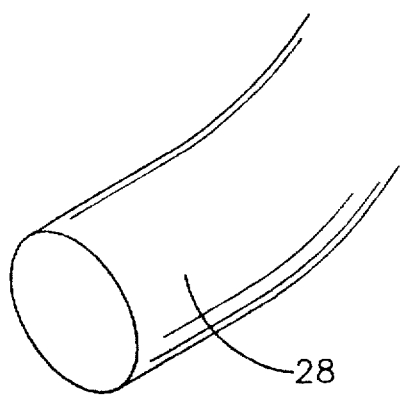
*FIG. 4c*  *FIG. 4c'*

SEAT UNIT AND CUSHION

BACKGROUND OF THE INVENTION

The invention relates generally to seat cushions and methods of molding seat units including seat cushions, and more particularly to a seat cushion comprised of a mesh of plastic filament wherein multiple cushion layers comprised of plastic filament may be combined, each cushion layer having a different density, as well as a method for molding the perimeter of a seat cushion with a seat base structure.

Presently, seat units used in furniture or in automobiles have internal cushioning comprised of expanded urethane or ethylene. Generally, as a load is applied to the seating area of the seat unit, the expanded urethane or ethylene cushion compresses, thus resulting in the cushion becoming more dense. This increased density results in less circulation of air throughout the cushion. Thus, the seating area of the seat unit is more likely to become overheated, resulting in the seated person becoming uncomfortable.

Also, in most present seat unit constructions, a woven seat covering is supported across a base structure with the perimeter of the woven seat covering secured to the base structure at spaced positions by staples, sewing, or the like. The tension in the covering is thus maintained only by the stapled or sewed strands of the woven material. Under load application, these strands soon become weakened and break or tear loose. Thus, these seat units have a relatively short service life with a lack of firmness and support for their intended purpose.

A superior seat unit construction is one where a pretensioned woven seat covering is molded in with a base structure. An effective method for molding a composite article such as this is disclosed in U.S. Pat. No. 4,743,323. While the method of molding in the woven seat covering helps to make the securement of the covering more durable, the problem of inadequate air circulation throughout the seat cushion of the seat unit is not rectified. This is because in order for a seat cushion to have adequate firmness, it has been necessary for the cushion to be so dense that inadequate air circulation therethrough results once a load is applied to the seating area.

These difficulties encountered in the prior art are substantially eliminated by the present invention.

SUMMARY OF THE INVENTION

Accordingly, it is an object of the present invention to provide a seat unit with firm cushioning as well as air circulation therethrough after a load is applied.

Another object of the present invention is to provide a method of making a seat unit where the seat unit has cushioning that not only has adequate firmness, but air circulation therethrough after a load is applied.

Yet another object of the present invention is to provide a seat unit in which cushioning is molded in with a base structure.

A further object of the present invention is to provide a method of making a seat unit in which cushioning is molded in with a base structure.

Another object of the present invention is to provide a seat unit having multiple layers of cushioning where the multiple layers are of differing density thereby allowing the cushion to have a desired firmness as well as air circulation therethrough after a load is applied.

Still another object of the present invention is to provide a method of molding in multiple layers of cushioning with a base structure where the multiple layers are of differing density thereby allowing the cushion to have a desired firmness as well as air circulation therethrough after a load is applied.

By the present invention, it is proposed to overcome the difficulties heretofore. To this end, a seat unit is provided comprising a base structure and at least one cushion layer comprised of a mesh of plastic filament. The cushion layer not only provides adequate firmness, but has air circulation therethrough. The perimeter of the cushion layer and/or the perimeter of a cover layer may be molded in with a plastic base structure, and there may be multiple cushion layers where each layer has a different density. The multiple layers of cushioning where each layer has a different density further allow the seat unit to have both a specifically desired firmness and air circulation therethrough. The invention also provides a method for molding in at least one cushion layer comprised of plastic filament with a base structure as well as molding in a spring layer and a cover layer.

Other features and advantages of the present invention will become apparent from a review of the following description, drawings, and claims.

BRIEF DESCRIPTION OF THE DRAWINGS

FIG. 4a is a schematic view of a cushion layer comprising a mesh of strands of plastic filament; FIG. 4a' cross sectional view of the plastic filament of the cushion layer shown in FIG. 4a;

FIG. 4b is a top, schematic view of a second cushion layer comprising a mesh of strands of plastic filament;

FIG 4b' a cross sectional view of the plastic filament of the second cushion layer shown in FIG. 4b;

FIG. 4c is a top, schematic view of a third cushion layer comprising a mesh of strands of plastic filament;

FIG. 4c' is a cross sectional view of the plastic filament of the third cushion layer shown in FIG. 4c;

DETAILED DESCRIPTION OF THE INVENTION

Figure 1:
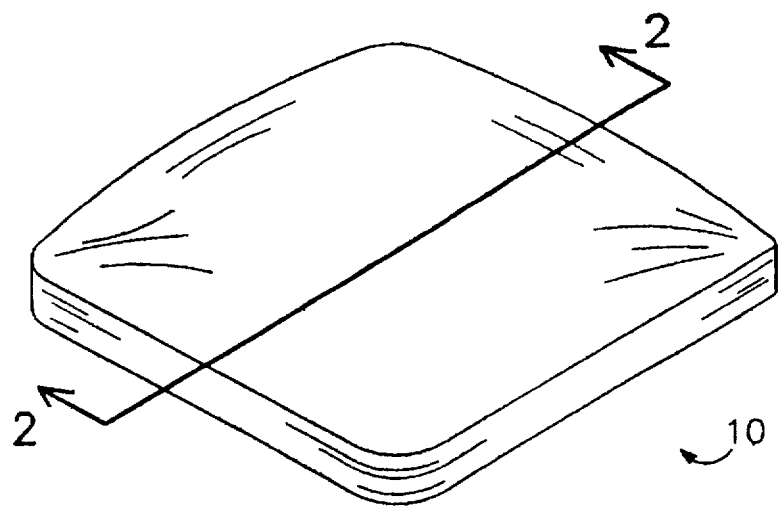
FIG. 1 is a perspective view of a seat unit where the seat unit has a structure in accordance present invention.
Figure 2:
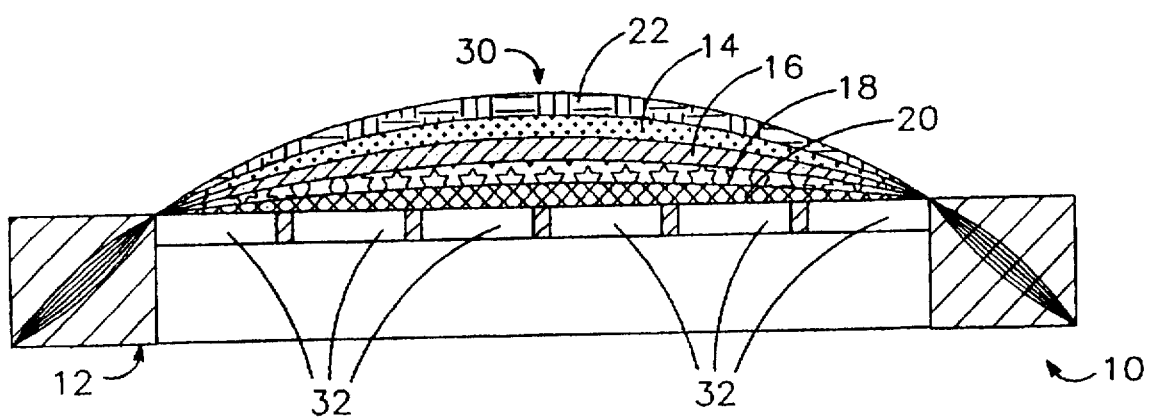
FIG. 2 is a elevational sectional view of the seat unit shown in FIG. 1 taken along line 2—2.
Figure 3:
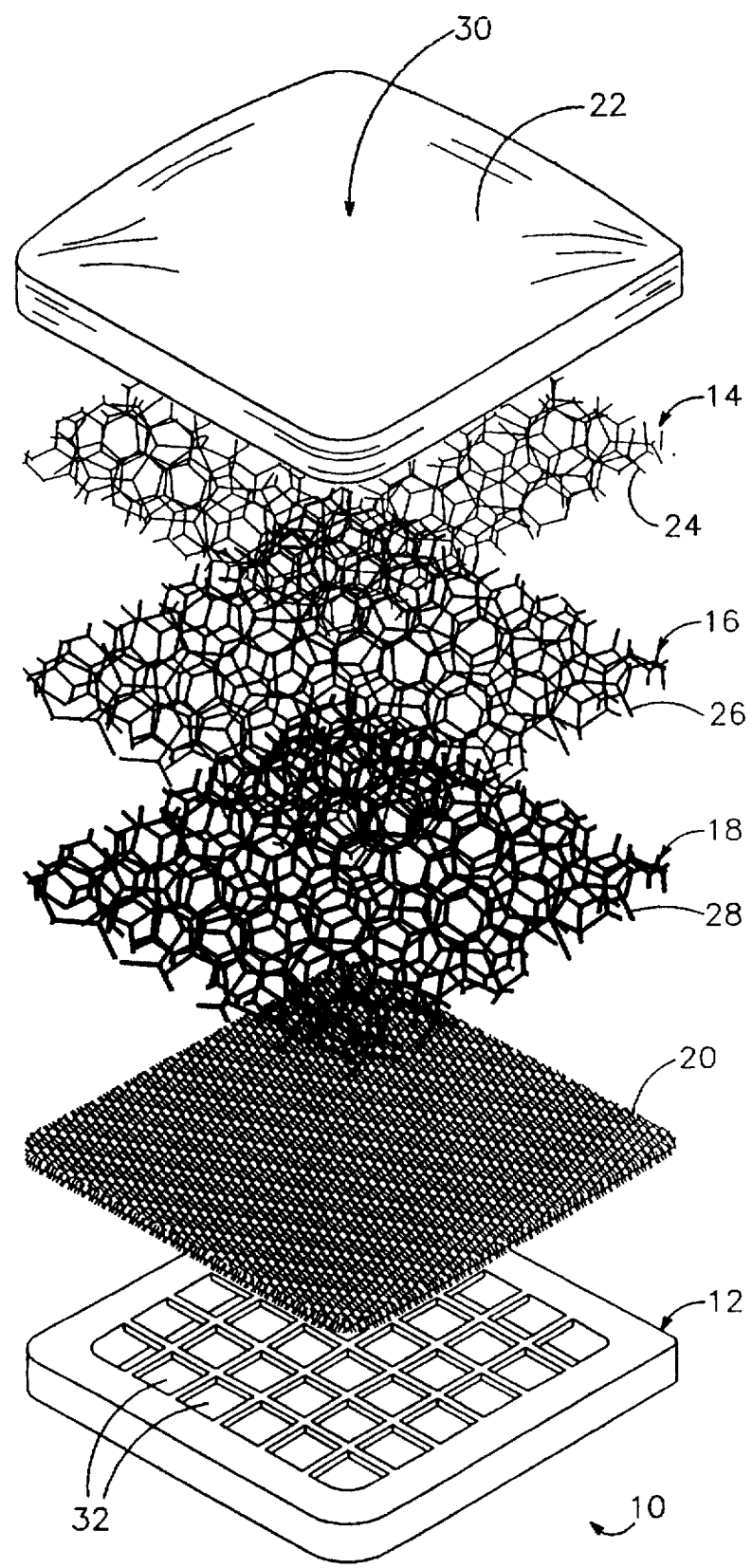
FIG. 3 is an exploded perspective view of the seat unit shown in FIGS. 1 and 2.

A seat unit 10 is generally shown in FIG. 1. In a preferred embodiment of the present invention, the seat unit 10 is provided as shown in FIG. 2 where the seat unit 10 includes a base structure 12 for supporting cushion layers 14, 16 and 18 sandwiched between a spring layer 20 and a cover layer 22. FIG. 3 is an exploded perspective view of the seat unit 10 of FIG. 2 showing the base structure 12, cushion layers 14, 16 and 18, spring layer 20 and cover layer 22. As schematically shown in FIG. 2, the spring layer 20, the cushion layers 14, 16 and 18, and the cover layer 22 are molded in with the base structure 12. The first layer closest to the base structure 12 is the spring layer 20. The spring layer 20 may be comprised of any material which adds firmness to the cushion layers 14, 16 and 18. Located on top of the spring layer 20 is a first cushion layer 18 having a high density. To provide that the first cushion layer 18 has a high density, the first cushion layer 18 may be comprised of a mesh of strands of plastic filament 28 as shown in FIGS. 3 and 4c where the plastic filament 28 has a relatively large diameter as shown in FIG. 4c'. Located on top of the first cushion layer 18 is a second cushion layer 16 having a medium density. To provide that the second cushion layer 16 has a medium density, the second cushion layer 16 may be comprised of a mesh of strands of plastic filament 26 as shown in FIGS. 3 and 4b, where the plastic filament 26 has a medium diameter as shown in FIG. 4b' and where there is less plastic filament 26 per cubic inch than of plastic filament 28 per cubic inch within the first cushion layer 18. Located on top of the second cushion layer 16 is a third cushion layer 14 having a relatively low density. To provide that the third cushion layer 14 has a relatively low density, the third cushion layer 14 may be comprised of a mesh of strands of plastic filament 24 as shown in FIGS. 3 and 4a, where the plastic filament 24 has a relatively small diameter as shown in FIG. 4a' and where there is less plastic filament 24 per cubic inch than of plastic filament 26 per cubic inch within the second cushion layer 16 and of plastic filament 28 per cubic inch within the first cushion layer 18. The plastic filament 24, 26 and 28 of cushion layers 14, 16 and 18 may be a continuous hot melt filament fiber or an extruded stringlike material which after being generally shaped into the cushion layers 14, 16 and 18, is deformed through a deforming process such as punching.

Figure 5:
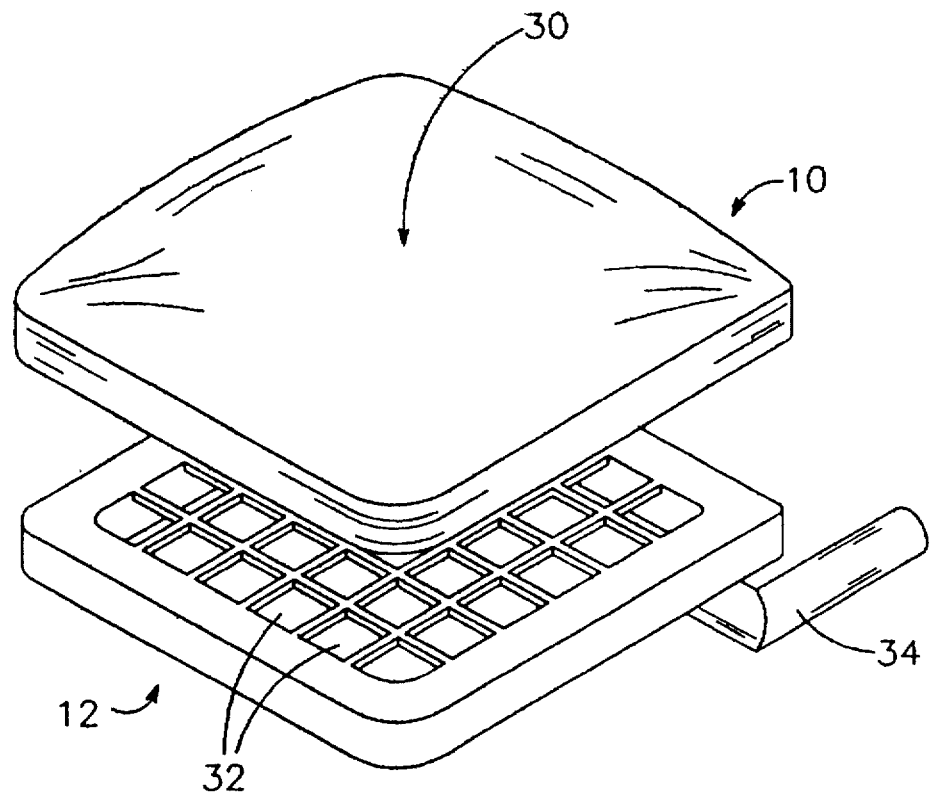
FIG. 5 is a perspective view showing the seat unit of FIGS. 1, 2 and 3 positioned over an air supply.

When a load (not shown) is applied to a seating area 30 of the seat unit 10 shown in FIGS. 2 and 3, the spring layer 20 supports the cushion layers 14, 16 and 18. Space between the plastic filament 24, 26 and 28 within each cushion layer 14, 16 and 18 allows air to move through the cushion layers 14, 16 and 18, thus resulting in the seating area 30 being less likely to overheat. Also, the base structure 12 is provided with air holes 32 such that the seat unit 10 may be positioned over an air supply line 34 as shown in FIG. 5 thus providing for maximum air circulation through the cushion layers 14, 16 and 18 and to the seating area 30.

Figure 6:
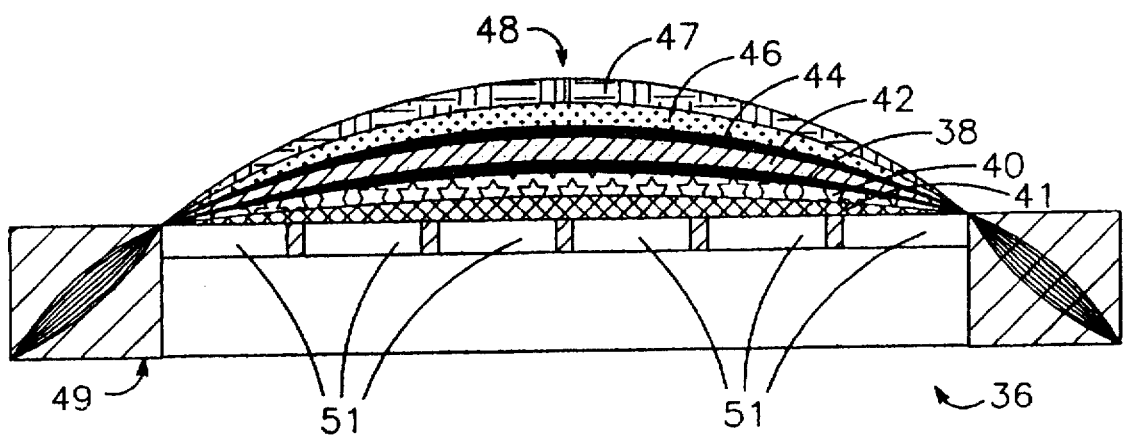
FIG. 6 is an elevational sectional view of a seat unit where the seat unit has barrier layers between cushion layers.
Figure 7:
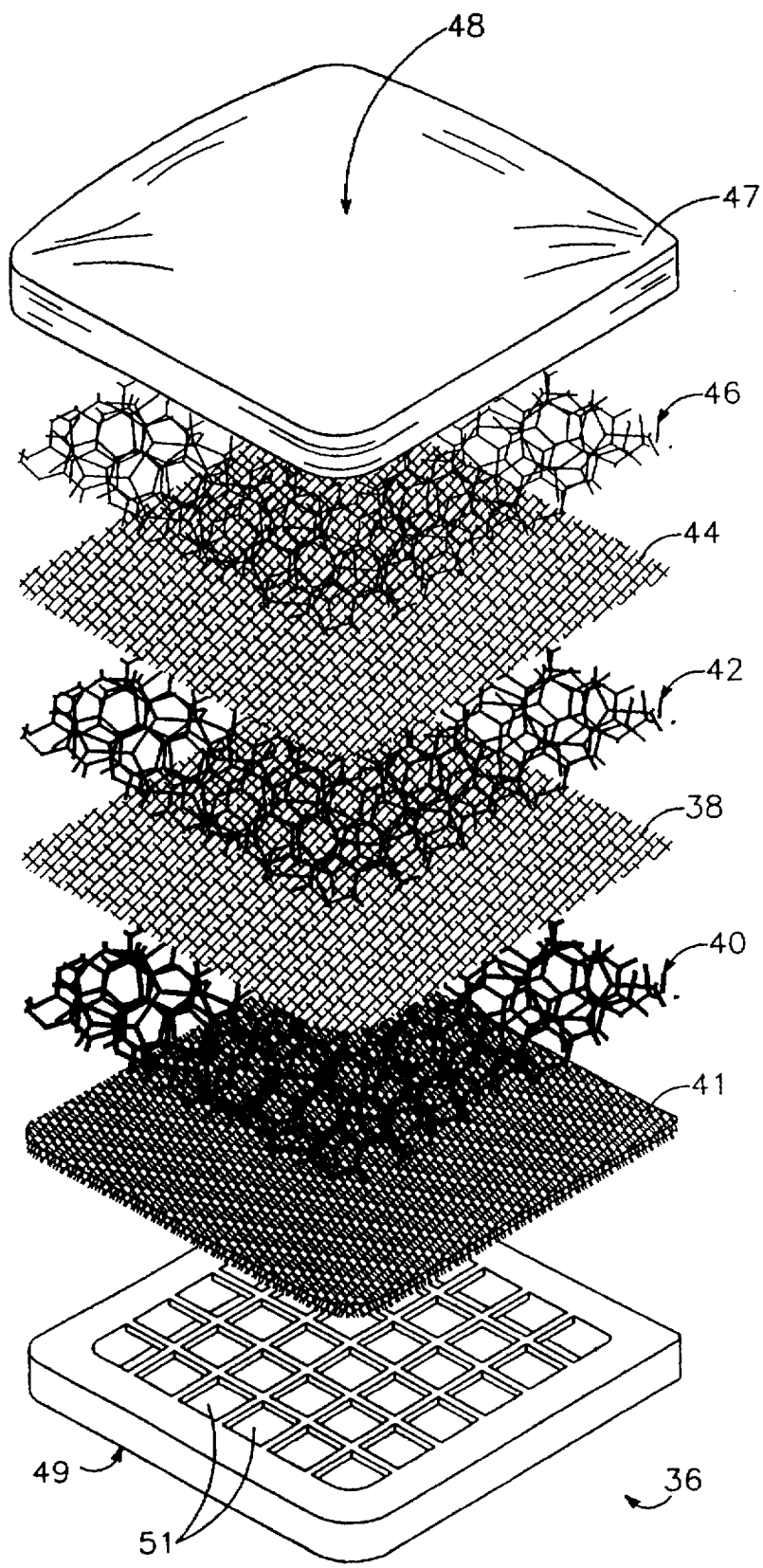
FIG. 7 is an exploded perspective view of the seat unit of FIG. 6.

While the foregoing explains the preferred embodiment, alternative embodiments are discussed below. One alternative to the preferred embodiment is to provide a seat unit 36 wherein a first barrier layer 38 is between cushion layers 40 and 42, and a second barrier layer 44 is between cushion layers 42 and 46 as shown in FIGS. 6 and 7. Cushion layers 40, 42 and 46 may be identical to cushion layers 18, 16 and 14, respectively, which were described above with relation to seat unit 10 shown in FIGS. 2 and 3. As shown in FIG. 6, the cushion layers 40, 42 and 46, barrier layers 38 and 44, a spring layer 41, and a cover layer 47 may be molded in with a base structure 49. The barrier layers 38 and 44 may be comprised of a textile, and the barrier layers 38 and 44 function to minimize penetration amongst the cushion layers 40, 42 and 46 when a load (not shown) is applied to a seating area 48 of the seat unit 36, thus maintaining the integrity of the difference in densities between the cushion layers 40, 42 and 46. Any or all of the cushion layers 40, 42 and 46 may be adhered, such as by flame adhesion, to the adjacent barrier layer 38 or 44. As an alternative to providing barrier layers 38 and 44, each cushion layer 40, 42 and 46 may have a melted or otherwise prepared densified side. Much like the base structure 12 shown in FIG. 2, the base structure 49 of FIG. 6 may have air holes 51 such that the seat unit 36 may be positioned over the air supply line 34 much like the seat unit 10 shown in FIG. 5.

Figure 8:
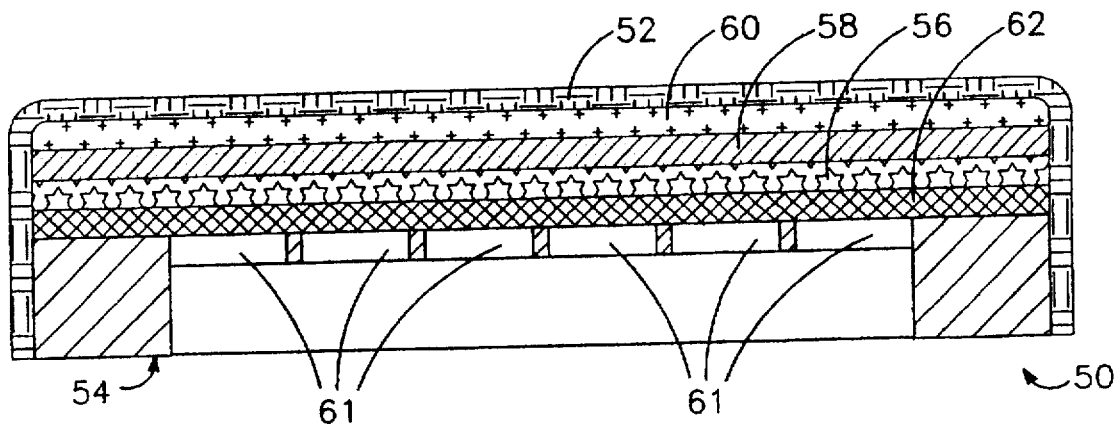
FIG. 8 is an elevational sectional view of a seat unit where a spring layer, cushion layers, and a cover layer are attached to a base structure in a conventional manner.

Furthermore, while it is preferable to provide the seat unit 10 as shown in FIG. 2 where the spring layer 20, the cushion layers 14, 16 and 18, and the cover layer 22 are molded in with the base structure 12, it is possible to provide additional alternative embodiments of the present invention comprising multiple cushion layers identical to cushion layers 14, 16 and 18 described above with relation to seat unit 10 shown in FIGS. 2 and 3. For example, as schematically shown in FIG. 8, a seat unit 50 may be provided such that the seat unit 50 is of a more conventional construction where a cover layer 52 is affixed to a base structure 54 through conventional means and neither cushion layers 56, 58, and 60 nor a spring layer 62 is molded in with the base structure 54. Much like the base structure 12 shown in FIG. 2, the base structure 54 shown in FIG. 8 may be provided with air holes 61 so that the seat unit 50 may be positioned over the air supply line 34 much like the seat unit 10 as shown in FIG. 5.

Figure 9:
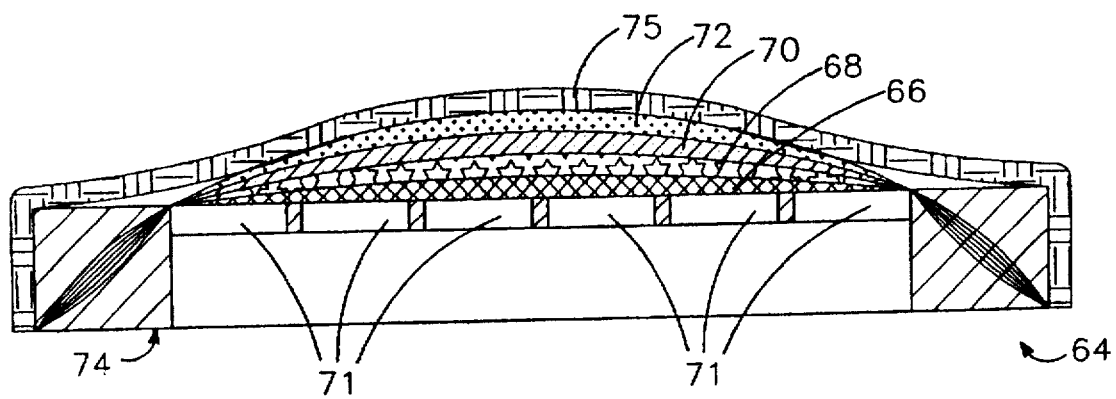
FIG. 9 is an elevational sectional view of a seat unit where a spring layer and cushion layers are molded in with a base structure, and a cover layer is attached to the base structure in a conventional manner.

Additionally, it is possible to provide a seat unit 64 as schematically shown in FIG. 9, where only a spring layer 66 and cushion layers 68, 70 and 72 are molded in with a base structure 74 while a cover layer 75 is not molded in, but is instead affixed to the base structure 74 through conventional means. As shown in FIG. 9, the base structure 74 may also be provided with air holes 71 so that the seat unit 64 may be positioned over the air supply line 34 much like the seat unit 10 as shown in FIG. 5.

Moreover, it is possible to provide the cushion layers in any of the embodiments mentioned above such that the first cushion layer closest to the spring layer is of low density, the second cushion layer is of medium density, and the third cushion layer is of high density. Finally, there are alternative ways in which to provide that each cushion layer has a different density. For example, it is possible to vary the diameters of the plastic filament and/or vary the amount of filament per cubic inch. One of ordinary skill in the art would undoubtedly realize still other possible variations of the present invention comprising multiple cushion layers. For example, it is possible to eliminate the spring layer from any of the embodiments described herein.

Figure 10:
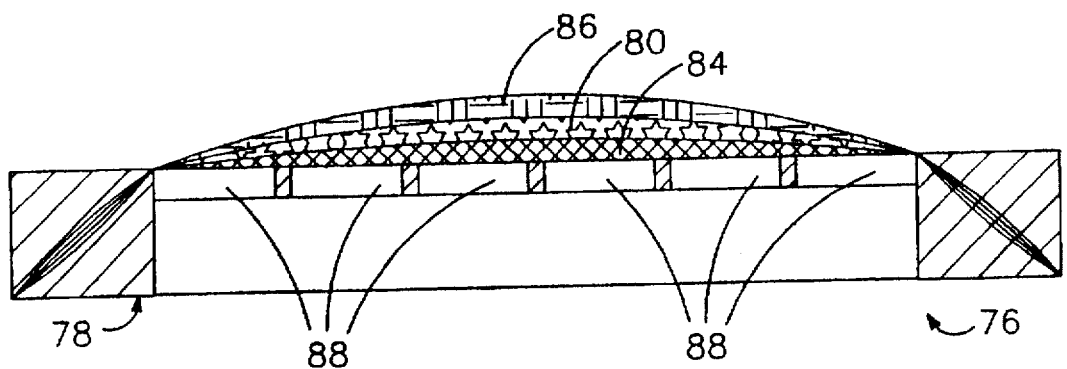
FIG. 10 is an elevational sectional view of a seat unit where a spring layer, a single cushion layer, and a cover layer are molded in with a base structure.

It is possible to provide a seat unit 76 as schematically shown in FIG. 10 where the seat unit 76 includes a base structure 78 for supporting a single cushion layer 80 comprised of a mesh of strands of plastic filament much like any of the cushion layers 14, 16 or 18 shown in FIGS. 4a, 4b or 4c. As shown in FIG. 10, the cushion layer 80 is sandwiched between a spring layer 84 and a cover layer 86, and the spring layer 84, the cushion layer 80, and the cover layer 86 may be molded in with the base structure 78. The base structure 78 may have air holes 88 such that the seat unit 76 may be positioned over the air supply line 34 in much the same manner as the seat unit 10 is positioned over the air supply line 34 as shown in FIG. 5, thus providing for maximum air circulation through the cushion layer 80.

Figure 11:
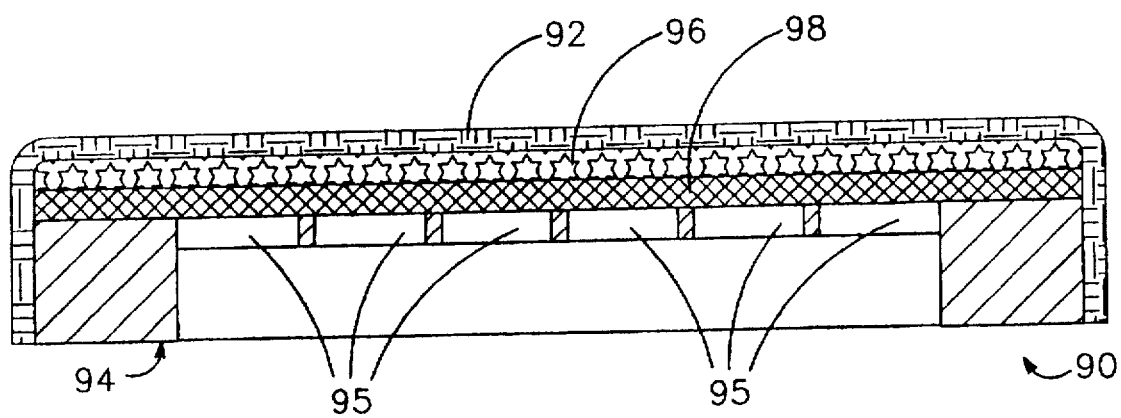
FIG. 11 is an elevational sectional view of a seat unit where a spring layer, a single cushion layer, and a cover layer are attached to a base structure in a conventional manner.

It is possible to provide alternative embodiments of the present invention including a single cushion layer comprising a mesh of strands of plastic filament. For example, as schematically shown in FIG. 11, a seat unit 90 may be provided such that the seat unit 90 is of a more conventional construction where a cover layer 92 is affixed to a base structure 94 through conventional means and neither a cushion layer 96 nor a spring layer 98 is molded in with the base structure 94. The base structure 94 may also be provided with air holes 95 as shown in FIG. 11.

Figure 12:
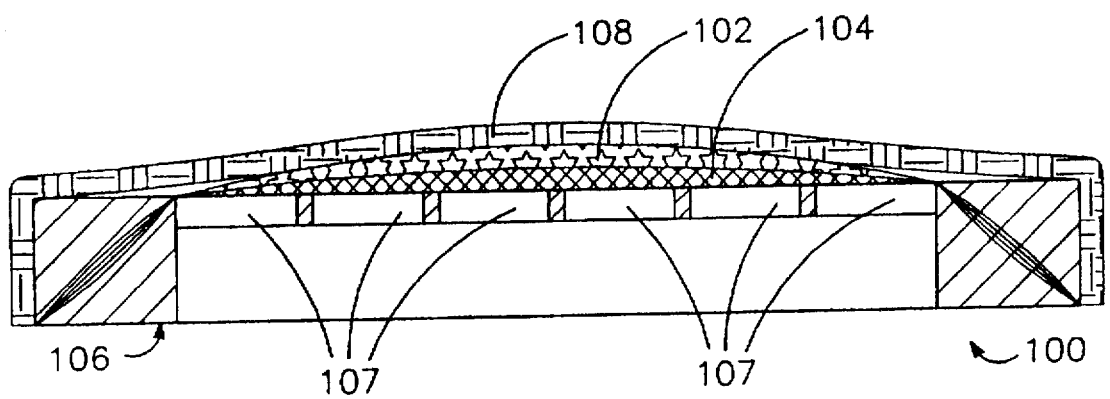
FIG. 12 is an elevational sectional view of a seat unit where a spring layer and a single cushion layer are molded in with a base structure, and a cover layer is attached to the base structure in a conventional manner.

Additionally, it is possible to provide a seat unit 100 as schematically shown in FIG. 12 where only a spring layer 102 and a cushion layer 104 are molded in with a base structure 106 while a cover layer 108 is not molded in, but is instead affixed to the base structure 106 through conventional means. The base structure 106 may be provided with air holes 107 as shown in FIG. 12. One of ordinary skill in the art would undoubtedly realize still other possible variations of the present invention including a single cushion layer comprised of plastic filament. For example, it is possible to provide the cushion layer with any density, and it is possible to eliminate the spring layer from any of the embodiments described herein.

Figure 13:
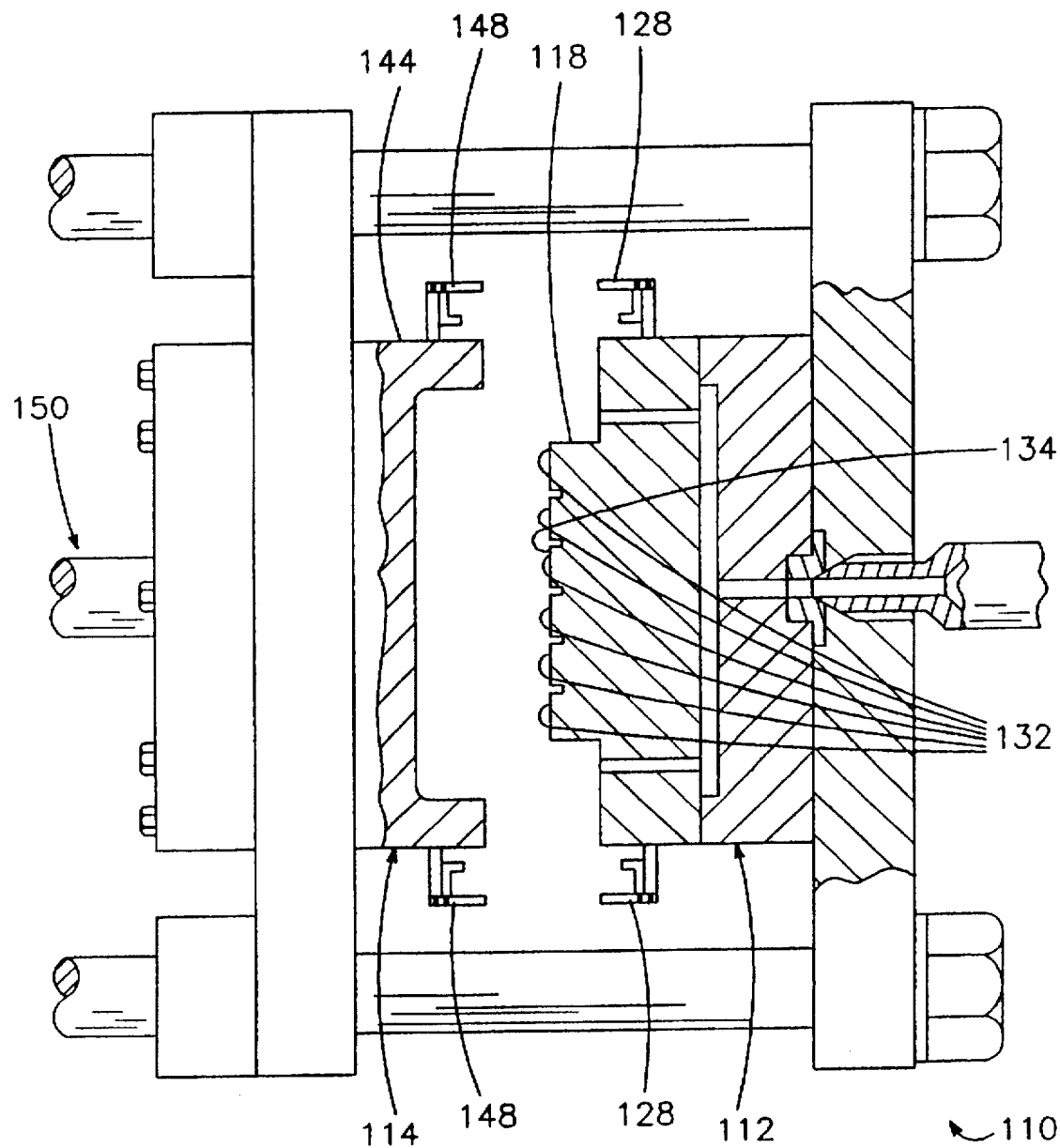
FIG. 13 shows a mold unit in an open position.
Figure 14:
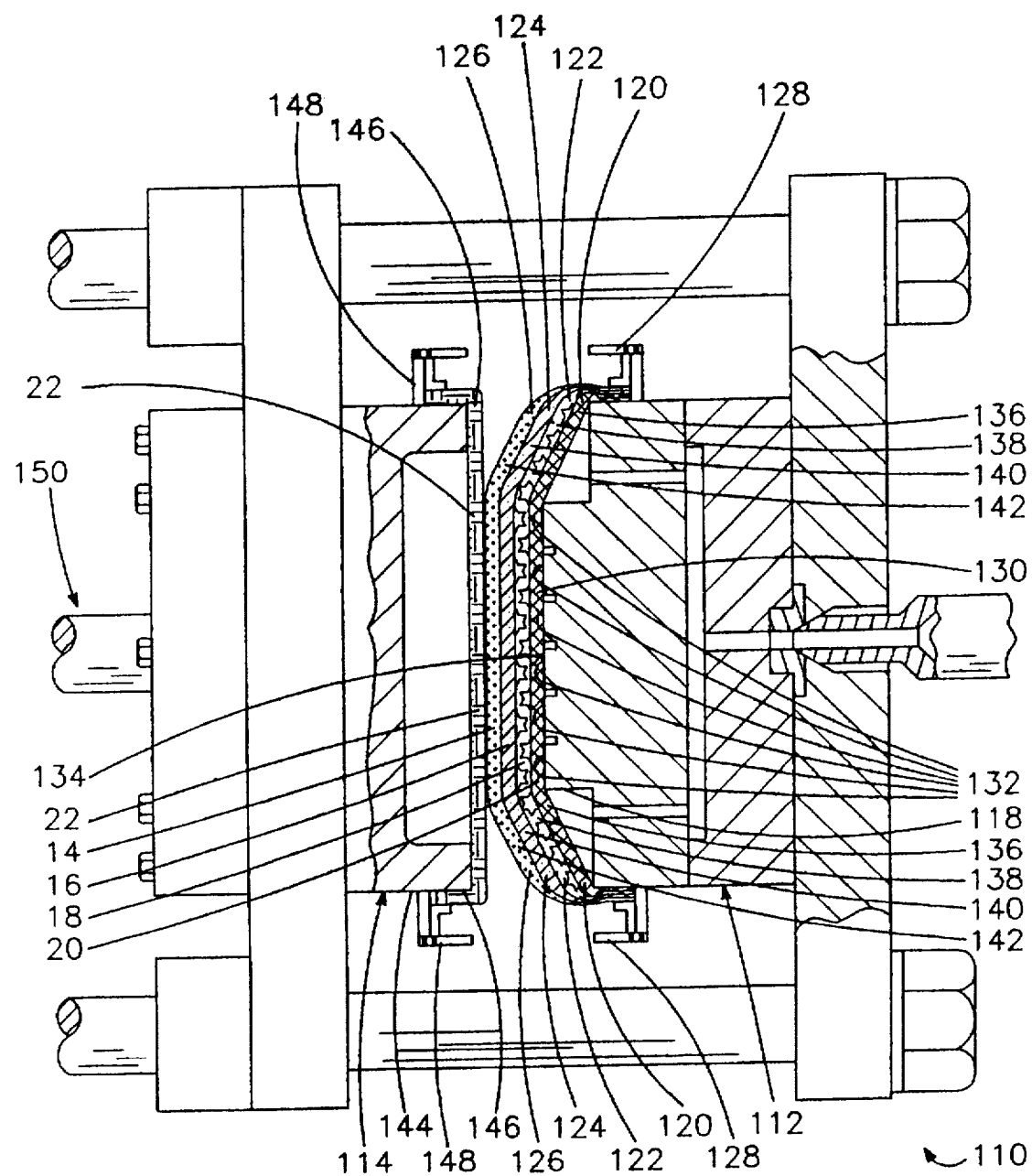
FIG. 14 shows the mold unit of FIG. 13 with a spring layer and cushion layers secured to a male mold section of the mold unit, and a cover layer secured to a female mold section of the mold unit.
Figure 15:
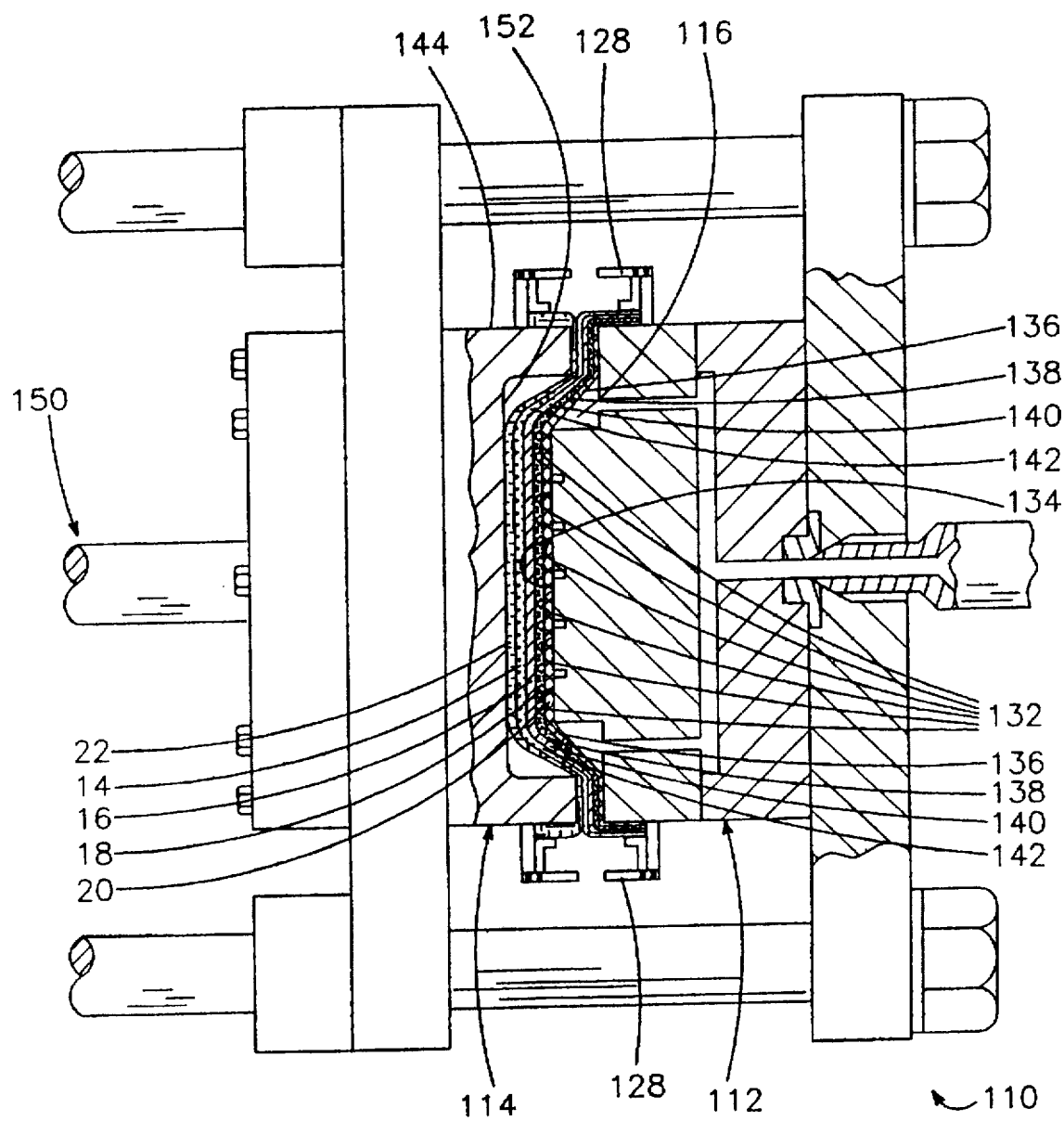
FIG. 15 shows the mold unit of FIGS. 13 and 14 in a closed position thus forming a mold cavity.

A plastic injection molding process such as the process described below may be utilized in order to construct any of the seat units described above. For example, the seat unit 10 of FIG. 2 may be constructed by utilizing the plastic injection molding process described below. Referring to FIG. 13, there is provided a mold unit 110 having a stationery male mold section 112 and a moveable female mold section 114. When the mold sections 112 and 114 are in their closed positions, as shown in FIG. 15, the mold sections 112 and 114 form a mold cavity 116 for forming the base structure 12 of the seat unit 10 shown in FIG. 2. When the mold sections 112 and 114 are in their open positions as shown in FIG. 13, the cushion layers 14, 16 and 18 and the spring layer 20, shown exaggerated for clarity, are placed across an open side 118 of the male mold section 112 with their outer edges 120, 122, 124 and 126 secured outside the male mold section 112 by suitable clamping means 128 as shown in FIG. 14. When secured to the male mold section 112, the spring layer 20 has a central portion 130 positioned against protrusions 132 on a projected central portion 134 of the male mold section 112, and the cushion layers 14, 16 and 18 and the spring layer 20 have inclined sections 136, 138, 140 and 142 extending from the projected central portion 134 of the male mold section 112 to the clamping means 128. This association of the cushion layers 14, 16 and 18 and the spring layer 20 with the male mold section 112 places the layers 14, 16, 18, and 20 under an initial tension. In like manner, the cover layer 22 is placed across an open side 144 of the female mold section 114 with its outer edges 146 secured outside the female mold section 114 by suitable clamping means 148. Alternatively, it is possible to secure the cover layer 22 across the male mold section 112 along with the cushion layers 14, 16 and 18 and the spring layer 20, or it is possible to secure the cushion layers 14, 16 and 18 and the spring layer 20 across the female mold section 114 along with the cover layer 22.

On movement of the female mold section 114 toward the male mold section 112 by a ram 150, into the closed position, as shown in FIG. 15, wherein the projected central portion 134 of the male mold section 112 is received within a coacting recess 152 formed within the female mold section 114, the inclined sections 136, 138, 140 and 142 of the cushion layers 14, 16 and 18 and the spring layer 20 are engaged by the female mold section 114 inwardly of the clamping means 128 and the inclined sections 136, 138, 140 and 142 move to a final position wherein outer portions 180, 182, 184 and 186 of the inclined sections 136, 138, 140 and 142 of the spring layer 20 and the cushion layers 14, 16 and 18 are clamped between the closed mold sections 112 and 114 and inner portions 158, 160, 162 and 164 of the inclined sections 136, 138, 140 and 142 are inclined diagonally traversely across the mold cavity 116. Additionally, the cover layer 22 is engaged by the male mold section 112 when the female mold section 114 is moved toward the male mold section 112 resulting in the cover layer 22 having outer sections 166 and inclined sections 168.

Figure 16:
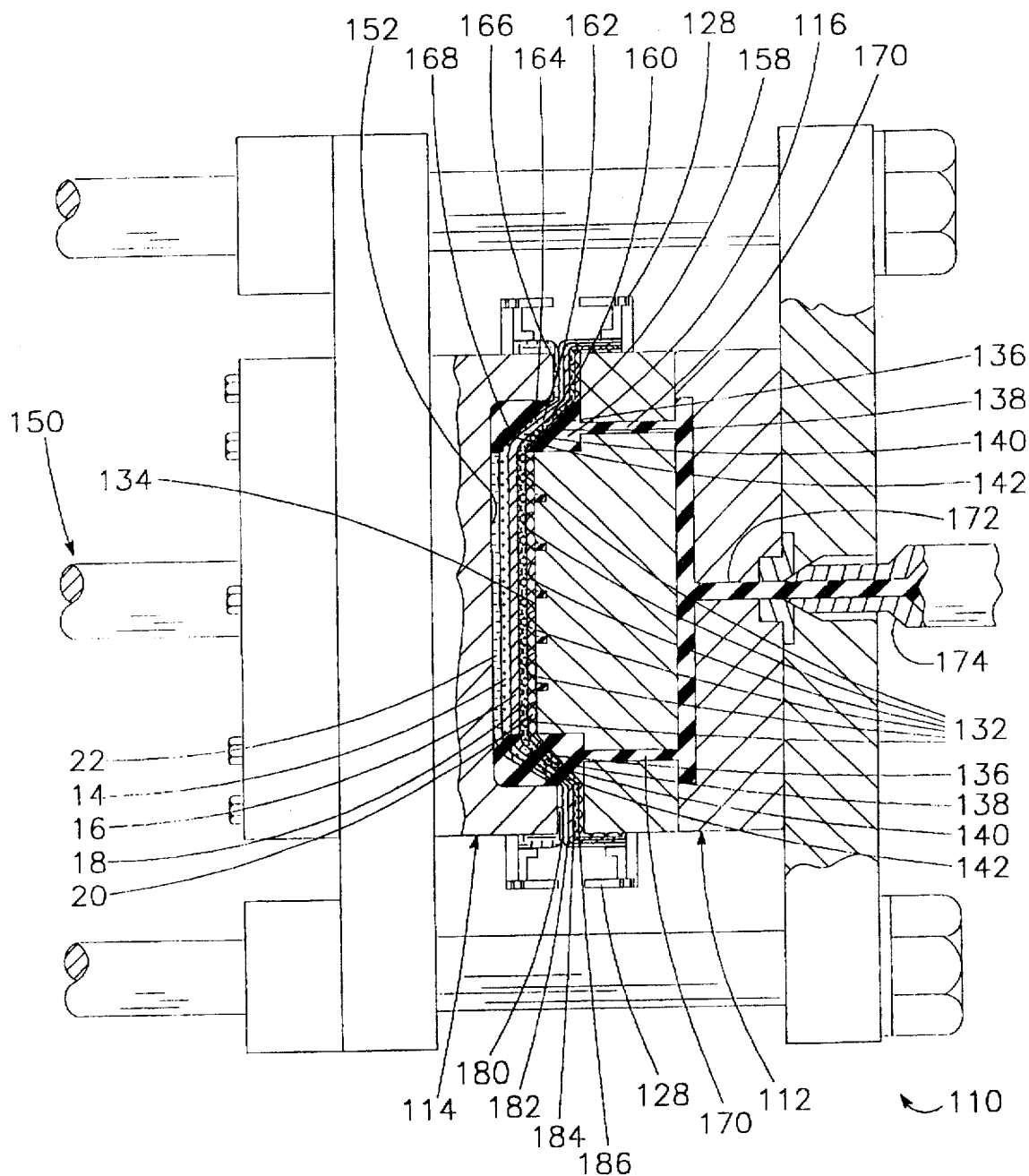
FIG. 16 shows the mold unit of FIGS. 15 with plastic material injected into the mold cavity.

A plastic material 170 is then injected into the mold cavity 116 through a gate opening 172 from an injection nozzle 174 to fill the mold cavity 116 as shown in FIG. 16 and surround the protrusions 132 on the projected central portion 134 of the male mold section 112. When the plastic material 170 is injected into the mold cavity 116, the inner portions 158, 160, 162, and 164 of the inclined sections 136, 138, 140 and 142 of the cushion layers 14, 16 and 18 and the spring layer 20 are imbedded within the injected plastic material 170 along with the inclined sections 168 of the cover layer 22. On removal from the mold unit 110 after the plastic material 170 has hardened, as shown in FIGS. 2 and 3, the base structure 12 has air holes 32 as a result of the plastic material 170 having surrounded the protrusions 132 in the mold cavity 116, and the cover layer 22, the cushion layers 14, 16 and 18, and the spring layer 20 are molded in with the base structure 12. Subsequently, the cushion layers 14, 16 and 18 and the spring layer 20 are trimmed at the junction of the outer 150, 152, 154 and 156 and inner portions 158, 160, 162 and 164 of the inclined sections 136, 138, 140 and 142 of the layers 14, 16, 18 and 20, and the cover layer 22 is trimmed at the junction of the outer sections 166 and inclined sections 168. Thereafter, the formed seat unit 10 may be positioned over an air supply line 34 as shown in FIG. 5 in order to maximize the air circulation through the cushion layers 14, 16 and 18. Instead of providing the projected central portion 134 of the male mold section 112 with protrusions 132, the male mold section 112 may be shaped such that the resulting base structure 12 has a true open central area, whereby a grid (not shown) is later attached to the base structure 12 to provide air holes 32 underneath the seat unit 10.

By virtue of the engagement of the inclined sections 136, 138, 140 and 142 of the cushion layers 14, 16 and 18 and the spring layer 20 by the female mold section 114 and its movement toward the male mold section 112, and the continuing of such engagement to the final closed positions of the mold sections 112 and 114, tension in the cushion layers 14, 16 and 18 and the spring layer 20 is increased uniformly to a final tension of the total area thereof extended across the base structure 12. Additionally, by virtue of the engagement of the inclined sections 168 of the cover layer 22 by the male mold section 112, and the continuing of such engagement to the final closed positions of the molds 112 and 114, tension in the cover layer 22 is increased uniformly to a final tension extended across the base structure 12. As shown in FIG. 2, under final tension, the cover layer 22, the cushion layers 14, 16 and 18, and the spring layer 20 lie in a plane common to the base structure 12.

Figure 17:
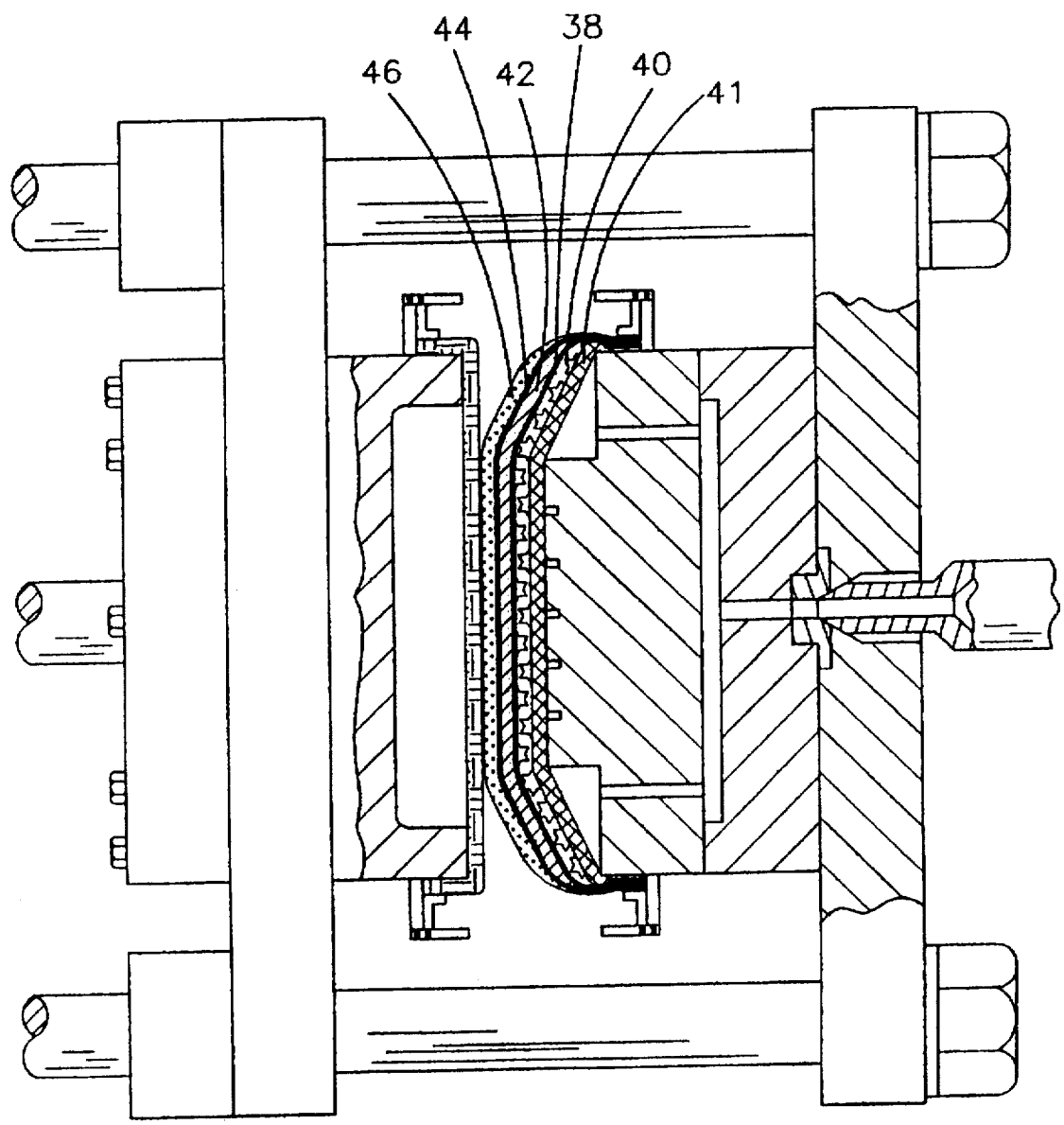
FIG. 17 shows the mold unit of FIG. 14 in an open position with barrier layers between the cushion layers.
Figure 18:
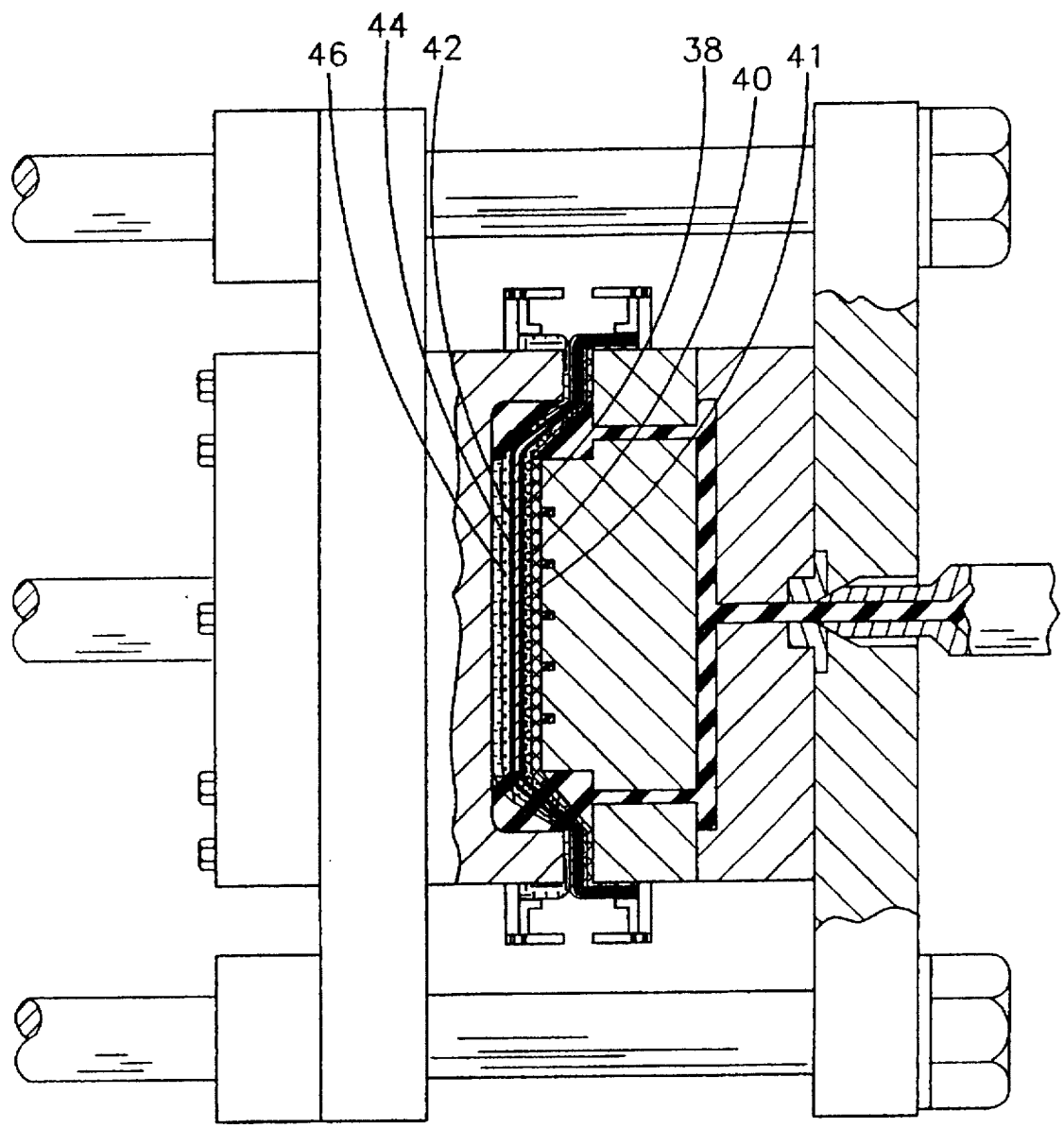
FIG. 18 shows the mold unit of FIG. 17 in a closed position with plastic injected into a mold cavity.

While the foregoing explains the preferred method, alternative methods are discussed below. One alternative to the preferred method is to utilize generally the method and mold unit 110 described above, but to also provide a first barrier layer 38 between cushion layers 40 and 42, and a second barrier layer 44 between cushion layers 42 and 46 as shown in FIGS. 17 and 18 in order to mold the seat unit 36 shown in FIGS. 6 and 7. As an alternative to providing barrier layers 38 and 44, each cushion layer 40, 42 and 46 may have a melted or otherwise prepared densified side (not shown).

Furthermore, while it is preferable to mold the seat unit 10 as shown in FIG. 2 where the spring layer 20, the cushion layers 14, 16 and 18, and the cover layer 22 are molded in with the base structure 12, it is possible to provide additional alternative methods of the present invention comprising multiple cushion layers. For example, in providing the seat unit 50 shown in FIG. 8, the base structure 54 alone may be molded by omitting the steps of securing any layers against either mold section 112 or 114, and upon removing the base structure 54 from the mold unit 110, the cover layer 52 may be affixed to the base structure 54 through conventional means so that the cushion layers 56, 58 and 60 and the spring layer 62 are sandwiched between the base structure 54 and the cover layer 52. Additionally, it is possible to mold the seat unit 64 schematically shown in FIG. 9, by molding in only the spring layer 66 and the cushion layers 68, 70 and 72 with the base structure 74, while the cover layer 75 is affixed to the base structure 74 through conventional means subsequent to the plastic injection molding process. Moreover, as discussed above, it is possible, within the molding process, to provide the cushion layers such that the cushion layer closest to the spring layer is of low density, the second cushion layer is of medium density, and the third cushion layer is of high density. Finally, as described above, there are alternative ways in which to provide that each cushion layer has a different density. For example, it is possible to vary the diameters of the plastic filament and/or vary the amount of filament per cubic inch. One of ordinary skill in the art would undoubtedly realize still other possible variations of the present invention comprising multiple cushion layers. For example, it is possible to eliminate the spring layer from any of the molding methods described herein.

Figure 19:
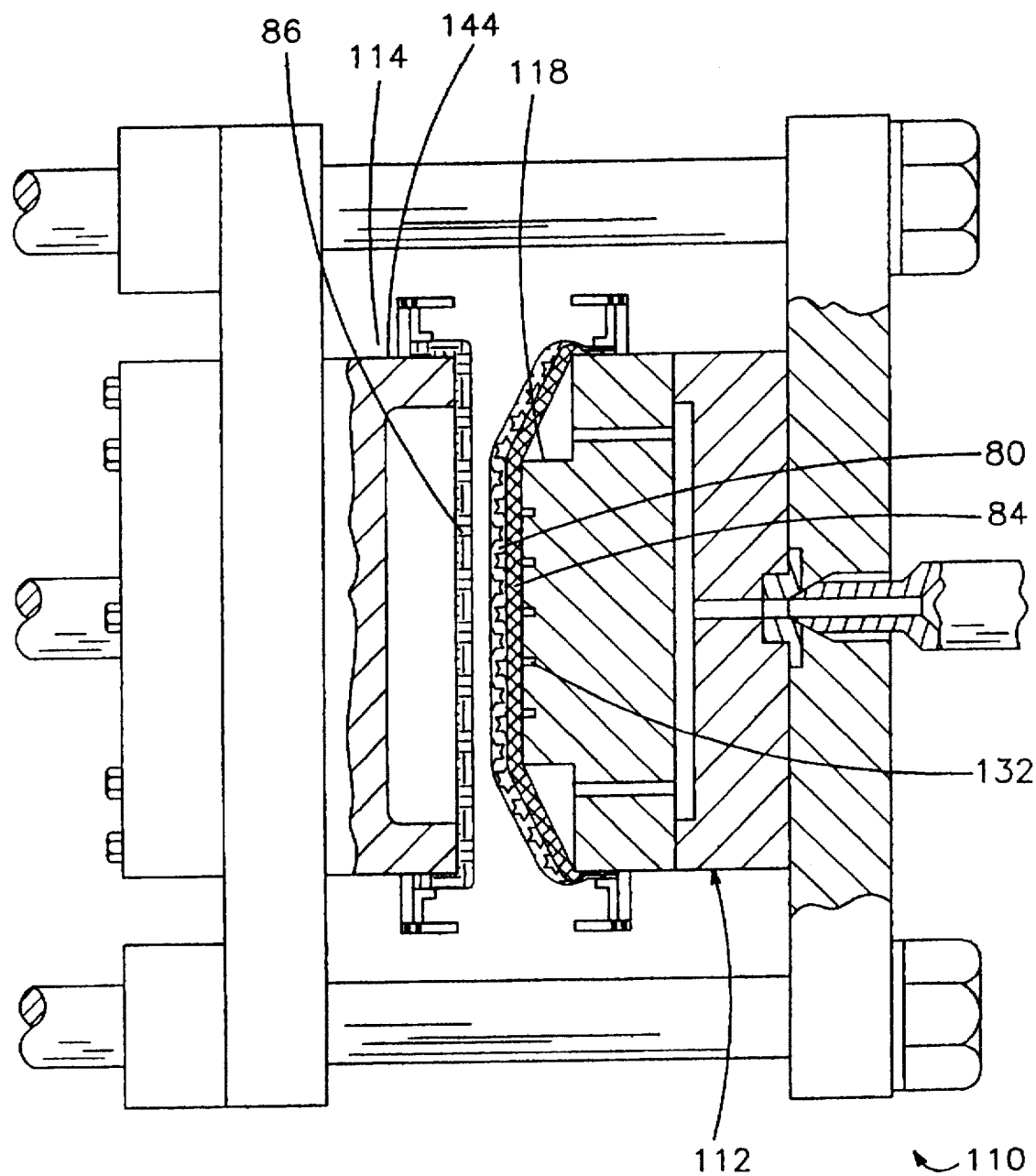
FIG. 19 shows the mold unit of FIG. 13 with a spring layer and a cushion layer secured to a male section of the mold unit, and a cover layer secured to a female section of the mold unit.

Instead of molding a seat unit having multiple cushion layers, it is possible to mold a seat unit having a single cushion layer comprised of plastic filament. For instance, a plastic injection molding process such as the process described below may be utilized in order to construct the seat unit 76 of FIG. 10. In molding the seat unit 76 shown in FIG. 10, a single cushion layer 80 comprised of a mesh of strands of plastic filament and a spring layer 84, shown exaggerated for clarity, are placed across the open side 118 of the male mold section 112, and the cover layer 86 is placed across the open side 144 of the female mold section 114 as shown in FIG. 19 in much the same manner as described above with relation to FIG. 14. Alternatively, it is possible to secure the cover layer 86 across the male mold section 112 along with the cushion layer 80 and the spring layer 84, or it is possible to secure the cushion layer 80 and the spring layer 84 across the female mold section 114 along with the cover layer 86.

Figure 20:
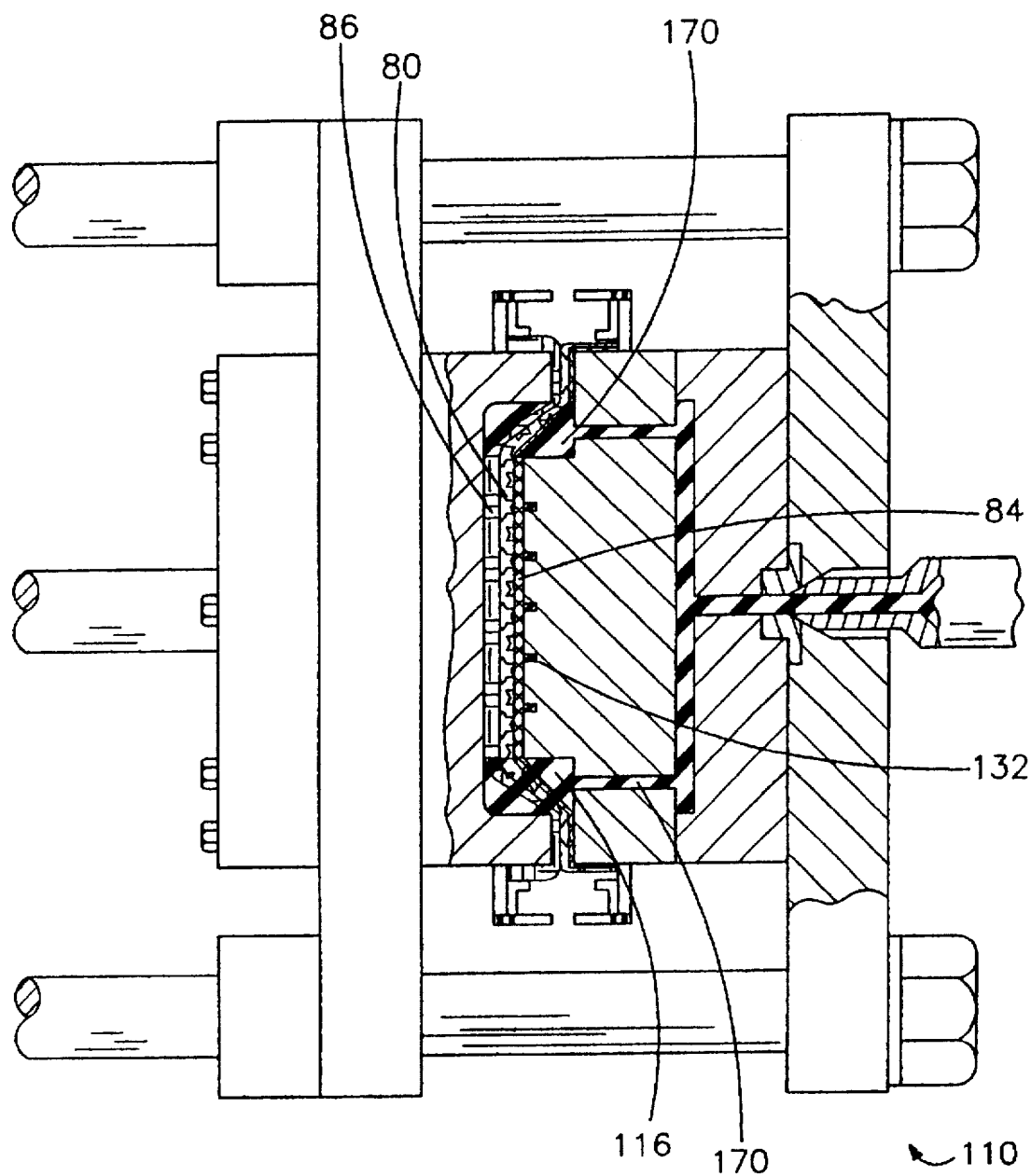
FIG. 20 shows the mold unit of FIG. 19 in a closed position with plastic material injected into a mold cavity.

In much the same manner as described above with relation to FIG. 16, after the mold sections 112 and 114 are brought together to form the mold cavity 116, plastic material 170 is then injected into the mold cavity 116 as shown in FIG. 20 and the resulting seat unit 76 is subsequently removed from the mold unit 110 after the plastic material 170 has hardened. Thereafter, the seat unit 76 may be positioned over the air supply line 34 in much the same manner as the seat unit 10 is positioned over the air supply line 34 as shown in FIG. 5 thus providing for maximum air circulation through the cushion layer 80.

While it is preferable to mold the seat unit 76 as shown in FIG. 10 where the spring layer 84, the single cushion layer 80 and the cover layer 86 are molded in with the base structure 78, additional methods of molding seat units including a single cushion layer comprising a mesh of strands of plastic filament are discussed below. It is possible to utilize generally the injection molding process described above to mold the seat unit 90 shown in FIG. 11 by molding only the base structure 94 and omitting the steps of securing any layers to either mold section 112 or 114. Upon removing the base structure 94 from the mold unit 110, the cover layer 92 may be affixed to the base structure 94 through conventional means so that the cushion layer 96 and the spring layer 98 are sandwiched between the base structure 94 and the cover layer 92. Additionally, it is possible to mold the seat unit 100 schematically shown in FIG. 12, by molding in only the spring layer 102 and the cushion layer 104 with the base structure 106, while the cover layer 108 is subsequently affixed to the base structure 106 through conventional means after the plastic injection molding process. One of ordinary skill in the art would undoubtedly realize still other possible variations of the present invention comprising a single cushion layer. For example, it is possible to eliminate the spring layer from any of the molding methods described herein.

The foregoing description and drawings merely explain and illustrate the invention and the invention is not limited thereto, except in so far as the claims are so limited, as those skilled in the art with the disclosure before them will be able to make modifications and variations therein without departing from the scope of the invention. For example, more or less than three cushion layers may be provided within a seat unit having multiple cushion layers, a spring layer may not be included within the seat unit, or a differently shaped base structure may be provided than that which is depicted herein.

I claim:

1. A seat unit comprising:
    (a) a base structure;
    (b) a cover layer secured to the base structure; and
    (c) a cushion layer between the base structure and the cover layer, said cushion layer comprised of a mesh of plastic filament.

2. The seat unit according to 1 further comprising air holes on the base structure.

3. The seat unit according to 1 wherein the base structure is comprised of plastic.

4. The seat unit according to 1 wherein the cover layer is comprised of fabric.

5. The seat unit according to 1 wherein at least a portion of the cushion layer is molded in with the base structure.

6. The seat unit according to 1 wherein at least a portion of the cover layer is molded in with the base structure.

7. The seat unit according to 1 wherein at least a portion of the cushion layer is molded in with the base structure and at least a portion of the cover layer is molded in with the base structure.

8. The seat unit according to 1 wherein the plastic filament is comprised of a hot melt filament fiber.

9. The seat unit according to 1 wherein the plastic filament is an extruded string-like material.

10. The seat unit according to 1 further comprising a spring layer between the cushion layer and the base structure.

11. The seat unit according to 10 wherein at least a portion of the spring layer is molded in with the base structure.

12. A seat unit comprising:

(a) a base structure;

(b) a cover layer secured to the base structure; and (c) at least two cushion layers between the base structure and the cover layer, at least two of said cushion layers comprising a mesh of plastic filament, at least one of the cushion layers having a different density than another cushion layer.

13. The seat unit according to 12 wherein at least one cushion layer comprises plastic filament of a first diameter and wherein at least one other cushion layer comprises plastic filament of a second diameter, said first diameter not being equal to said second diameter.

14. The seat unit according to 12 wherein at least one cushion layer comprises plastic filament in a first average weight of filament per square inch and wherein at least one other cushion layer comprises plastic filament in a second average weight of filament per square inch, said first average weight not being equal to said second average weight.

15. The seat unit according to 12 further comprising a barrier layer between two cushion layers.

16. The seat unit according to 15 wherein the barrier layer is adhered to at least one cushion layer.

17. The seat unit of claim 12 wherein at least one cushion layer has a melted side.

18. The seat unit according to 12 further comprising air holes on the base structure.

19. The seat unit according to 12 wherein the base structure is comprised of plastic.

20. The seat unit according to 12 wherein the cover layer is comprised of fabric.

21. The seat unit according to 12 wherein at least a portion of the cushion layer is molded in with the base structure.

22. The seat unit according to 12 wherein at least a portion of the cover layer is molded in with the base structure.

23. The seat unit according to 12 wherein at least a portion of the cushion layer is molded in with the base structure and at least a portion of the cover layer is molded in with the base structure.

24. The seat unit according to 12 wherein the plastic filament is comprised of a hot melt filament fiber.

25. The seat unit according to 12 wherein the plastic filament is an extruded string-like material.

26. The seat unit according to 12 further comprising a spring layer between a cushion layer and the base structure.

27. The seat unit according to 26 wherein at least a portion of the spring layer is molded in with the base structure.

* * * * *